United States Patent
Johnson

(10) Patent No.: US 11,469,417 B2
(45) Date of Patent: *Oct. 11, 2022

(54) SURFACE-FUNCTIONALIZED, ACIDIFIED METAL OXIDE MATERIAL IN AN ACIDIFIED ELECTROLYTE SYSTEM OR AN ACIDIFIED ELECTRODE SYSTEM

(71) Applicant: HHeLi, LLC, Tulsa, OK (US)

(72) Inventor: Paige L. Johnson, Tulsa, OK (US)

(73) Assignee: HHeLi, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,435

(22) Filed: May 22, 2020

(65) Prior Publication Data

US 2020/0287211 A1    Sep. 10, 2020

Related U.S. Application Data

(63) Continuation of application No. 15/814,094, filed on Nov. 15, 2017, now Pat. No. 10,700,349.

(60) Provisional application No. 62/422,483, filed on Nov. 15, 2016.

(51) Int. Cl.
*H01M 4/48* (2010.01)
*C01G 23/053* (2006.01)
(Continued)

(52) U.S. Cl.
CPC ............ *H01M 4/483* (2013.01); *C01G 19/02* (2013.01); *C01G 23/04* (2013.01); *C01G 23/053* (2013.01); *C01G 25/02* (2013.01); *C01G 49/02* (2013.01); *H01M 4/366* (2013.01); *H01M 4/523* (2013.01); *H01M 6/164* (2013.01); *H01M 6/168* (2013.01); *H01M 10/052* (2013.01); *H01M 10/0567* (2013.01); *H01M 10/0568* (2013.01);
(Continued)

(58) Field of Classification Search
None
See application file for complete search history.

(56) References Cited

U.S. PATENT DOCUMENTS 4,502,936 A    3/1985  Hayfield
5,296,319 A    3/1994  Bito et al.
(Continued)

FOREIGN PATENT DOCUMENTS

AU    2007/330996 B2    6/2008
CA        2824842 A1    8/2008
(Continued)

OTHER PUBLICATIONS

U.S. Appl. No. 15/814,094, filed Nov. 17, 2017.
(Continued)

*Primary Examiner* — Daniel S Gatewood
(74) *Attorney, Agent, or Firm* — Kilpatrick Townsend & Stockton LLP

(57) ABSTRACT

Described herein are acidified metal oxide ("AMO") materials useful in applications such as a battery electrode or photovoltaic component, in which the AMO material is used in conjunction with one or more acidic species. Advantageously, batteries constructed of AMO materials and incorporating acidic species, such as in the electrode or electrolyte components of the battery exhibit improved capacity as compared to a corresponding battery lacking the acidic species.

18 Claims, 13 Drawing Sheets

(51) Int. Cl.
| | |
|---|---|
| H01M 10/052 | (2010.01) |
| H01M 10/0568 | (2010.01) |
| C01G 19/02 | (2006.01) |
| C01G 23/04 | (2006.01) |
| C01G 25/02 | (2006.01) |
| C01G 49/02 | (2006.01) |
| H01M 4/36 | (2006.01) |
| H01M 4/52 | (2010.01) |
| H01M 6/16 | (2006.01) |
| H01M 10/0567 | (2010.01) |
| H01M 10/0569 | (2010.01) |

(52) U.S. Cl.
CPC ..... *H01M 10/0569* (2013.01); *C01P 2002/85* (2013.01); *C01P 2006/40* (2013.01); *H01M 2300/004* (2013.01)

(56) References Cited

U.S. PATENT DOCUMENTS

| | | | |
|---|---|---|---|
| 6,007,945 | A | 12/1999 | Jacobs et al. |
| 6,171,571 | B1 | 1/2001 | Bedard et al. |
| 6,670,300 | B2 | 12/2003 | Werpy et al. |
| 6,746,983 | B2 | 6/2004 | Gaffney et al. |
| 7,053,022 | B2 | 5/2006 | Gaffney et al. |
| 7,147,834 | B2 | 12/2006 | Wong et al. |
| 7,166,263 | B2 | 1/2007 | Vanderspurt et al. |
| 7,314,682 | B2 | 1/2008 | Thackeray et al. |
| 7,582,276 | B2 | 9/2009 | Nonninger |
| 7,611,750 | B2 | 11/2009 | Yi et al. |
| 7,612,011 | B2 | 11/2009 | Vanderspurt et al. |
| 7,718,568 | B2 | 5/2010 | Gaffney et al. |
| 7,732,096 | B2 | 6/2010 | Thackeray et al. |
| 7,825,064 | B2 | 11/2010 | Wong et al. |
| 8,088,707 | B2 | 1/2012 | Kim et al. |
| 8,148,011 | B2 | 4/2012 | Thackeray et al. |
| 8,173,827 | B2 | 5/2012 | Chang et al. |
| 8,303,841 | B2 | 11/2012 | Li et al. |
| 8,318,384 | B2 | 11/2012 | Luo et al. |
| 8,383,077 | B2 | 2/2013 | Thackeray et al. |
| 8,480,998 | B2 | 7/2013 | Hagemeyer et al. |
| 8,493,711 | B2 | 7/2013 | Seymour |
| 8,503,162 | B2 | 8/2013 | Seymour |
| 8,614,878 | B2 | 12/2013 | Seymour |
| 8,658,126 | B2 | 2/2014 | Toledo et al. |
| 8,685,283 | B2 | 4/2014 | Wei et al. |
| 8,759,245 | B2 | 6/2014 | Chang et al. |
| 8,828,904 | B2 | 9/2014 | Wei et al. |
| 8,871,374 | B2 | 10/2014 | Vaughey |
| 8,889,078 | B2 | 11/2014 | Ji et al. |
| 8,921,257 | B2 | 12/2014 | Hazin et al. |
| 8,926,860 | B2 | 1/2015 | Sun et al. |
| 8,969,238 | B2 | 3/2015 | Fehrmann et al. |
| 9,012,351 | B2 | 4/2015 | Yang et al. |
| 9,098,001 | B2 | 8/2015 | Tashiro et al. |
| 9,130,226 | B2 | 9/2015 | Thackeray et al. |
| 9,786,910 | B2 | 10/2017 | Johnson et al. |
| 10,700,349 | B2 | 6/2020 | Johnson |
| 10,978,704 | B2 | 4/2021 | Johnson et al. |
| 2002/0086213 | A1 | 7/2002 | Utsugi et al. |
| 2003/0065216 | A1 | 4/2003 | Tanimoto et al. |
| 2004/0201948 | A1 | 10/2004 | Hosoya et al. |
| 2004/0219428 | A1 | 11/2004 | Nagayama |
| 2005/0202171 | A1 | 9/2005 | Shin |
| 2006/0188781 | A1 | 8/2006 | Thackeray et al. |
| 2007/0048435 | A1 | 3/2007 | Suzuki et al. |
| 2007/0287067 | A1 | 12/2007 | Takahashi et al. |
| 2008/0272740 | A1 | 11/2008 | Martinet et al. |
| 2009/0017378 | A1* | 1/2009 | Charest ............... H01M 4/625 429/212 |
| 2009/0027056 | A1 | 1/2009 | Huang et al. |
| 2010/0016443 | A1 | 1/2010 | Toledano et al. |
| 2010/0027192 | A1 | 2/2010 | Perry et al. |
| 2010/0099031 | A1 | 4/2010 | Kato et al. |
| 2010/0129724 | A1 | 5/2010 | Kolosnitsyn |
| 2010/0203121 | A1 | 8/2010 | Toledano et al. |
| 2011/0033746 | A1 | 2/2011 | Liu et al. |
| 2011/0129709 | A1 | 6/2011 | Ahn et al. |
| 2011/0206974 | A1 | 8/2011 | Inoue et al. |
| 2011/0259244 | A1 | 10/2011 | Herbig et al. |
| 2011/0305940 | A1 | 12/2011 | Usami et al. |
| 2012/0058397 | A1 | 3/2012 | Zhamu et al. |
| 2012/0085978 | A1 | 4/2012 | Tashiro et al. |
| 2012/0237819 | A1 | 9/2012 | Ahn |
| 2012/0238842 | A1 | 9/2012 | Colvin, Jr. et al. |
| 2013/0017340 | A1 | 1/2013 | Brown et al. |
| 2013/0026409 | A1 | 1/2013 | Baker et al. |
| 2013/0078518 | A1 | 3/2013 | Thackeray et al. |
| 2013/0216911 | A1 | 8/2013 | Hosoya et al. |
| 2013/0224603 | A1 | 8/2013 | Chen et al. |
| 2013/0255872 | A1 | 10/2013 | Zhong |
| 2013/0266872 | A1 | 10/2013 | Adamson et al. |
| 2013/0330640 | A1 | 12/2013 | Badding et al. |
| 2014/0027670 | A1 | 1/2014 | Sun et al. |
| 2014/0187413 | A1 | 7/2014 | Lagaron et al. |
| 2014/0212694 | A1 | 7/2014 | Park et al. |
| 2014/0242445 | A1 | 8/2014 | Gozdz et al. |
| 2014/0343203 | A1 | 11/2014 | Miltner et al. |
| 2015/0044565 | A1 | 2/2015 | Wang et al. |
| 2015/0065667 | A1 | 3/2015 | Cheng et al. |
| 2015/0069295 | A1 | 3/2015 | Ho et al. |
| 2015/0079471 | A1 | 3/2015 | Fang et al. |
| 2015/0087505 | A1 | 3/2015 | Sanchez et al. |
| 2015/0126774 | A1 | 5/2015 | Hiraoka et al. |
| 2015/0151280 | A1 | 6/2015 | Sanchez Valente et al. |
| 2015/0155595 | A1* | 6/2015 | Ogihara ............... H01M 4/525 429/188 |
| 2015/0238937 | A1 | 8/2015 | Kang et al. |
| 2015/0263342 | A1 | 9/2015 | Newbound et al. |
| 2015/0287978 | A1 | 10/2015 | Lockett et al. |
| 2015/0303459 | A1 | 10/2015 | Kovalenko et al. |
| 2016/0293957 | A1 | 10/2016 | Okae et al. |
| 2017/0141389 | A1 | 5/2017 | Johnson et al. |
| 2017/0214079 | A1 | 7/2017 | Dai et al. |
| 2018/0294479 | A1 | 10/2018 | Johnson et al. |
| 2018/0337404 | A1 | 11/2018 | Johnson |

FOREIGN PATENT DOCUMENTS

| | | |
|---|---|---|
| CA | 2744601 A1 | 9/2013 |
| CN | 105543961 A | 5/2016 |
| DE | 102013206736 A1 | 10/2014 |
| DE | 102013224206 A1 | 5/2015 |
| EP | 1739139 A1 | 1/2007 |
| EP | 1888311 A4 | 6/2011 |
| EP | 2545776 A2 | 1/2013 |
| EP | 2662914 A2 | 11/2013 |
| EP | 2662915 A2 | 11/2013 |
| EP | 1997169 B1 | 8/2015 |
| JP | 2008013427 A | 1/2008 |
| JP | 2009535781 A | 10/2009 |
| KR | 101125593 B1 | 3/2012 |
| WO | 0023510 A1 | 4/2000 |
| WO | 2006/124670 A2 | 11/2006 |
| WO | 2007/085077 A1 | 8/2007 |
| WO | 2007129842 A1 | 11/2007 |
| WO | 2008/066293 A1 | 6/2008 |
| WO | 2008/072239 A2 | 6/2008 |
| WO | 2008/093347 A2 | 8/2008 |
| WO | 2008/131551 A1 | 11/2008 |
| WO | 2015/078745 A1 | 6/2015 |
| WO | 2017/087404 A1 | 5/2017 |
| WO | 2017/087408 A1 | 5/2017 |

OTHER PUBLICATIONS

U.S. Appl. No. 15/352,388, filed Nov. 15, 2016.
Adschiri, et. al; "Hydrothermal Synthesis of Metal Oxide Nanoparticles at Supercritical Conditions," Journal of Nanoparticle Research Jun. 2001, vol. 3, issue 2, pp. 227-235.

(56) References Cited

OTHER PUBLICATIONS

Barbe, et. al., "Nanocrystalline Titanium Oxide Electrodes for Photovoltaic Applications." Journal of the American Ceramic Society, 1997. vol. 50, No. 12; abstract; pp. 3157-3158, 3168.

Briois, et. al., "Solid-State and Solution Structural Study of Acetylacetone-Modified tin(IV) Chloride Used as a Precursor of SnO2 Nanoparticles Prepared by a Sol-Gel Route," Chemistry of Materials, 2004, vol. 16, No. 20, pp. 3885-3894.

Chen, et.al., "Size effect of tin oxide nanoparticles on high capacity lithium battery anode materials," Surface and Coatings Technology, vol. 202, issues 4-7, Dec. 15, 2007, pp. 1313-1318.

Chunwen, et. al; "Monodisperse Porous LiFePO4 Microspheres for a High Power Li-Ion Battery Cathode;" Journal of the American Chemical Society; 2011, 133 (7), pp. 2132-2135.

Ding, et. al; "Nanoscale Magnesium Hydroxide and Magnesium Oxide Powders: Control Over Size, Shape, and Structure via Hydrothermal Synthesis", Chemistry of Materials; Jan. 2001; vol. 13, No. 2, 2001.

Feng, "The Synthesis and Characterization of Phosphonic Acids for the Surface Modification Study on Indium Tin Oxide.," A Dissertation Presented to The Academic Faculty, Georgia Institute of Technology, 2012 (URL: http://hdl.handle.net/1853/44723).

Hino, et. al., "Reactions of Butane and Isobutane Catalyzed by Zirconium Oxide Treated with Sulfate Ion. Soiid Superacid Catalyst," Journal of the American Chemical Society, 1979, vol. 101, No. 21, pp. 6439-6441.

Hofmann, e.t al., "Highly Monodisperse Water-Dispersable Iron Oxide Nanoparticles for Biomedical Applications," Journal of Materials Chemistry, 2010. vol. 20. No. 36, pp. 7842-7853.

Holland, et. al., "NMR Characterization of Phosphonic Acid Capped SnO2 Nanoparticles," Chemistry of Materials, 2007, vol. 19, No. 10, pp. 2519-2526.

Jouhannaud, et. al.: "Rapid Synthesis of Tin (IV) Oxide Nanoparticles by Microwave Induced Thermohydrolysis," Journal of Solid State Chemistry, 2008. vol. 181, No. 6, pp. 1439-1444.

Lim et al., "Spherical tin oxide, SnO2 particles fabricated via facile hydrothermal method for detection of mercury (II) ions," International Journal of Electrochemical Science, 2011, vol. 6, pp. 4329-4340.

Lu, et. al; "Electrochemical Properties of Tin Oxide Anodes for Sodium-ion Batteries," Journal of Power Sources; 284 (2015) pp. 287-295.

Lu, et. al; "Improved Electrochemical Performance of Tin-Sulfide Anodes for Sodium-Ion Batteries" Journal of Materials Chemistry A; Jun. 24, 2015.

Mousavand, et. al; "Supercritical Hydrothermal Synthesis ofOorganic-Inorganic Hybrid Nanoparticles," Journal of Materials Science Mar. 2006, vol. 41, Issue 5, pp. 1445-1448.

Munoz, et. al., "Comparative Study of Two Wet Chemical Methods of BaSnO3 Synthesis: Mechanism of Formation of Mixed Oxide," Powder Technology, Apr. 7, 2015 (e-pub), vol. 279, pp. 86-95.

Nitta, et., al; "High-Capacity Anode Materials for Lithium-Ion Batteries: Choice of Elements and Structures for Active Particles," www.materialsviews.com; 2013.

Queffelec, et. al., "Surface Modification Using Phosphonic Acids and Esters," Chemical Reviews. 2012, vol. 112, No. 7, pp. 3777-3807.

Rabuffetti et. al; "Synthesis-Dependent Surface Acidity and Structure of SrTiO3 Nanoparticles," Dept of Chemistry, Northwestern University, J. Phys. Chem. C. 2010 114 (25), pp. 1056-11067.

Subramanian, et. al; "Hydrothermal Synthesis and Pseudocapacitance Properties of MnO2 Nanostructures," J Phys. Chem B, 2005, 109 (43), pp. 20207-20214.

Sugunan, et. al., "Catalysis by Some Metal Oxides Modified with Phosphate Ions," Indian Journal of Chemistry, 2002, vol. 41A, pp. 2251-2255.

Venere, "Nanoparticle Network Could Bring Fast-Charging Batteries," Purdue University. Dec. 3, 2014. 2 pages.

Wang, et. al; "Selected-Control Hydrothermal Synthesis of Alpha- and Beta-MnO(2) Single Crystal Nanowires," Journal of the American Chemical Society, Apr. 2002, vol. 124, No. 12, 2002, pp. 2880-2881.

Ying, et. al., "Electrochemical Properties of Tin Oxide Anodes for Sodium-Ion Batteries". Journal of Power Sources, 284,(2015) pp. 287-295.

International Patent Application No. PCT/US2016/062068, International Search Report and Written Opinion dated Mar. 2, 2017, 10 pages.

International Patent Application No. PCT/US2016/062073, International Search Report and Written Opinion dated Mar. 2, 2017, 12 pages.

International Patent Application No. PCT/US2017/061866, International Search Report and Written Opinion dated Jan. 17, 2018, 13 pages.

International Preliminary Report on Patentability dated May 31, 2019 in related application No. PCT/US2017/061866, all pgs.

Zhou et al., "Ultra-Uniform SnOx/Carbon Nanohybrids toward Advanced Lithium-Ion Battery Anodes", "Advanced Materials 2014", pp. 3943-3949, vol. 26, Publisher: wileyonlinelibrary.com.

\* cited by examiner

| Reagents used for synthesis | O (atomic %) | S (atomic %) | Cl (atomic %) | Metal (atomic %) | pH |
|---|---|---|---|---|---|
| Metal-chloride and HCl | 58.6 | - | 2.3 | 27.9 | 2.0 |
| Metal-sulfate and H₂SO₄ | 58.3 | 2.0 | - | 26.2 | 1.2 |

FIG. 3

| Reagents used for synthesis | O (at. conc., %) | P (at. conc., %) | O-C=O (at. conc., %) | Metal (at. conc., %) |
|---|---|---|---|---|
| Metal-acetate and phosphoric acid | 59.6 | 3.0 | 0.4 | 27.3 |

FIG. 7

SURFACE-FUNCTIONALIZED, ACIDIFIED METAL OXIDE MATERIAL IN AN ACIDIFIED ELECTROLYTE SYSTEM OR AN ACIDIFIED ELECTRODE SYSTEM

CROSS-REFERENCE TO RELATED APPLICATIONS

This application is a continuation of U.S. application Ser. No. 15/814,094, filed on Nov. 15, 2017, which claims the benefit of and priority to U.S. Provisional Application 62/422,483, filed Nov. 15, 2016, both of which are hereby incorporated by reference in their entireties for all purposes. This application also incorporates by reference U.S. Provisional Applications 62/256,065 and 62/256,059, both filed on Nov. 16, 2015, and U.S. Nonprovisional application Ser. No. 15/352,388, filed on Nov. 15, 2016, now U.S. Pat. No. 9,786,910.

FIELD

This invention is in the field of materials useful in chemical energy storage and power devices such as, but not limited to, batteries. More specifically, the invention relates to acidified metal oxide ("AMO") nanomaterials and use in applications such as electrochemical cell materials (batteries), catalysts, photovoltaic components, and sensors.

BACKGROUND

Metal oxides are compounds in which oxygen is bonded to metal, having a general formula $M_mO_x$. They are found in nature but can be artificially synthesized. In synthetic metal oxides, the method of synthesis can have broad effects on the nature of the surface, including its acid/base characteristics. A change in the character of the surface can alter the properties of the oxide, affecting such things as its catalytic activity and electron mobility. The mechanisms by which the surface controls reactivity, however, are not always well characterized or understood. In photocatalysis, for example, the surface hydroxyl groups are thought to promote electron transfer from the conduction band to chemisorbed oxygen molecules.

Despite the importance of surface characteristics, the metal oxide literature, both scientific papers and patents, is largely devoted to creating new, nanoscale, crystalline forms of metal oxides for improved energy storage and power applications. Metal oxide surface characteristics are ignored and, outside of the chemical catalysis literature, very little innovation is directed toward controlling or altering the surfaces of known metal oxides to achieve performance goals.

The chemical catalysis literature is largely devoted to the creation of "superacids"-acidity greater than that of pure sulfuric acid (18.4 M $H_2SO_4$)—often used for large-scale reactions such as hydrocarbon cracking. Superacidity cannot be measured on the traditional pH scale, and is instead quantified by Hammet numbers. Hammet numbers ($H_0$) can be thought of as extending the pH scale into negative numbers below zero. Pure sulfuric acid has an $H_0$ of −12.

There are, however, many reaction systems and many applications for which superacidity is too strong. Superacidity may, for example, degrade system components or catalyze unwanted side reactions. However, acidity may still be useful in these same applications to provide enhanced reactivity and rate characteristics or improved electron mobility. However, the battery literature teaches that acidic groups are detrimental in batteries.

SUMMARY

This application describes materials corresponding to acidified metal oxides ("AMO") and applications for using the AMOs, including in batteries, such as in battery electrode materials, as catalysts, as photovoltaic or photoactive components, and sensors. Techniques for preparing AMOs and devices comprising AMOs are further disclosed. The disclosed AMOs are advantageously used in combination with acidic species to enhance their utility.

The AMOs described include those in the form of a nanomaterial, such as a nanoparticulate form, which may be monodispersed or substantially monodispersed and have particle sizes less than 100 nm, for example. The disclosed AMOs exhibit low pH, such as less than 7 (e.g., between 0 and 7), when suspended in water or resuspended in water, such as at a particular concentration (e.g., 5 wt. %), and further exhibit a Hammett function, $H_0$, that is greater than −12 (i.e., not superacidic), at least on the surface of the AMO.

The surface of the AMOs may optionally be functionalized, such as by acidic species. Synthesis and surface functionalization may be accomplished in a "single-pot" hydrothermal method in which the surface of the metal oxide is functionalized as the metal oxide is being synthesized from appropriate precursors. This single-pot method does not require any additional step or steps for acidification beyond those required to synthesize the metal oxide itself, and results in an AMO material having the desired surface acidity (but not superacidic).

Optionally, surface functionalization occurs using strong electron-withdrawing groups ("EWGs")—such as $SO_4$, $PO_4$, or halogens—either alone or in some combination with one another. Surface functionalization may also occur using EWGs that are weaker than $SO_4$, $PO_4$, or halogens. For example, the synthesized metal oxides may be surface-functionalized with acetate ($CH_3COO$), oxalate ($C_2O_4$), and citrate ($C_6H_5O_7$) groups.

Despite the conventional knowledge that acidic species are undesirable in batteries because they can attack metal current collectors and housings and cause deterioration in other electrode components, and that active, catalytic electrode surfaces can lead to electrolyte decomposition, gas generation within the cell, and ultimately in cell failure, the inventors have discovered that acidic species and components can be advantageous in batteries employing AMO materials in battery electrodes.

For example, the combination or use of the AMO with acidic species can enhance the performance of the resultant materials, systems or devices, yielding improved capacity, cyclability, and longevity of devices. As an example, batteries employing AMO materials in combination with acidic electrolytes or electrolytes containing acidic species as described herein exhibit considerable gains in capacity, such as up to 100 mAh/g or more greater than similar batteries employing non-acidified electrolytes or electrolytes lacking acidic species. Improvements in capacity between 50 and 300 mAh/g may be achieved. In addition, absolute capacities of up to 1000 mAh/g or more are achievable using batteries having acidified electrolytes or electrolytes including acidic species. Moreover, cycle life of a battery may be improved through the use of acidic electrolytes or electrolytes containing acidic species, such as where a battery's cycle life is extended by up to 100 or more cycles.

In addition or alternatively, batteries including an electrode, such as a cathode, that is itself acidic or that includes acidic species, such as an organic acid, may also be beneficial and, again, contrary to the conventional teaching in battery technology. For example, batteries incorporating acidic electrodes or acidic species within the electrode may enhance the performance and yield improved capacity, cyclability, and longevity, particularly when used in electrodes including AMO materials. Capacity gains of up to 100 mAh/g or greater are achievable. Cycle life of a battery may also be improved through the use of acidic electrodes or electrodes containing acidic species, such as where a battery's cycle life is extended by up to 100 or more cycles. As an example, an acidic electrode or an electrode that includes acidic species may exhibit a pH less than 7 (but not be superacidic), such as when components of the electrode are suspended in water (or resuspended in water after drying) at 5 wt. %.

As a further example, batteries in which the electrode is formed using an acidic slurry may also be beneficial and contrary to the conventional teaching in battery technology. As described herein, the AMO material may optionally formed into battery electrode by first forming a slurry of the AMO material with one or more binder compounds, solvents, additives, and/or other wet processing materials. The slurry may be deposited on a conductive material or current collector in order to form an electrode. Such a slurry and/or a solvent may be acidic or include acidic species and, again, allow for improvements in capacity, cyclability, and longevity of the resultant battery. Optionally, all or a portion of the solvent may be evaporated, leaving the AMO material, binder, additives, etc. The resultant material may optionally exhibit its acidity, such having a pH less than 7 (but not superacidic), when suspended in water (or resuspended in water after drying) at 5 wt. %, for example.

As described above, acidic species may be included as an additive to any of the components of a battery, such as an electrode or an electrolyte. Optionally, a battery comprising an AMO may include an electrolyte positioned between the electrodes in which acidic species are dissolved in a solvent. Such an electrolyte may also be referred to herein as an acidified electrolyte. The electrolyte may optionally include one or more lithium salts dissolved in the solvent, such as $LiPF_6$, $LiAsF_6$, $LiClO_4$, $LiBF_4$, $LiCF_3SO_3$, and combinations of these. It will be appreciated that the electrolyte may be positioned not only in the space separating the electrodes (i.e., between the electrodes), but may also penetrate through or into pores of the electrodes and/or through or into pores of any materials or structures optionally positioned between the electrodes, such as a separator.

Example acidic species useful with the AMOs, electrodes, and electrolytes described herein include but are not limited to organic acids, such as carboxylic acids. Example acidic species include those exhibiting a $pK_a$ in water of between −10 and 7, between −5 and 6, between 1 and 6, between 1.2 and 5.6, or about 4. Specific example organic acids include, for example, oxalic acid, carbonic acid, citric acid, maleic acid, methylmalonic acid, formic acid, glutaric acid, succinic acid, methylsuccinic acid, methylenesuccinic acid, citraconic acid, acetic acid, benzoic acid. Example organic acids include dicarboxylic acids, such as those having a formula of

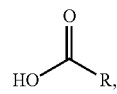

where R is a substituted or unsubstituted C1-C20 hydrocarbon, such as a substituted or unsubstituted alkyl group, a substituted or unsubstituted alkenyl group, a substituted or unsubstituted aromatic or heteroaromatic, a substituted or unsubstituted amine, etc. Example organic acids also include those having a formula of

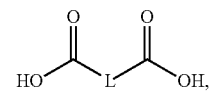

where L is a substituted or unsubstituted C1-C20 divalent hydrocarbon, such as a substituted or unsubstituted alkylene group, a substituted or unsubstituted arylene group, a substituted or unsubstituted heteroarylene group, a substituted or unsubstituted amine, etc. Organic acids may include organic acid anhydrides, such as having a formula of

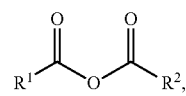

where $R^1$ and $R^2$ are independently a substituted or unsubstituted C1-C20 hydrocarbon, such as a substituted or unsubstituted alkyl group, a substituted or unsubstituted alkenyl group, a substituted or unsubstituted aromatic or heteroaromatic group, a substituted or unsubstituted amine, etc. Optionally, $R^1$ and $R^2$ can form a ring. Example organic acid anhydrides include any anhydrides of the above mentioned organic acids. Specific organic acid anhydrides include, but are not limited to glutaric anhydride, succinic anhydride, methylsuccinic anhydride, maleic anhydride, and itaconic anhydride.

Useful concentrations of the acidic species in either or both the electrolyte and the AMO electrode include from 0.01 wt. % to 10 wt. %, from 0.1 wt. % to 10 wt. %, from 1 wt. % to 5 wt. %, or from 3 wt. % to 5 wt. %.

Useful solvents include those employed in lithium ion battery systems, for example, such as ethylene carbonate, butylene carbonate, propylene carbonate, vinylene carbonate, dimethyl carbonate, diethyl carbonate, dipropyl carbonate, ethylmethyl carbonate, methylpropyl carbonate, ethylpropyl carbonate, fluoroethylene carbonate and mixtures thereof. Other useful solvents will be appreciated to those skilled in the art.

Example binders useful with the batteries and electrodes described herein include Styrene Butadiene Copolymer (SBR), Polyvinylidene Fluoride (PVDF), Carboxy methyl cellulose (CMC), Styrene Butadiene Rubber (SBR), acrylonitrile, polyacrylic acid (PAA), polyvinyl alcohol (PVA), polyamide imide (PAI), and any combination of these.

Methods of making batteries are also described herein. An example method of making a battery comprises making an AMO nanomaterial; forming a first electrode of or comprising the AMO nanomaterial; forming an electrolyte by dissolving one or more acidic species in a solvent; and positioning the electrolyte between the first electrode and a second electrode. Another example method of making a battery comprises making an AMO nanomaterial; forming a first electrode of or comprising the AMO nanomaterial and one or more acidic species; and positioning the electrolyte between the first electrode and a second electrode.

Acidified electrolytes for use in batteries are also disclosed herein. For example, the disclosed acidified electrolytes are useful in batteries comprising a first electrode and a second electrode, such as a first electrode that comprises an acidified metal oxide (AMO) nanomaterial. Example acidified electrolytes comprise a solvent; one or more metal salts dissolved in the solvent; and an acidic species dissolved in the solvent, wherein the acidic species is different from the one or more metal salts.

As described above, a variety of acidic species are useful in the disclosed acidified electrolytes, such as an acidic species comprising an organic acid and/or an organic acid anhydride. Example organic acids include, but are not limited to, oxalic acid, acetic acid, citric acid, maleic acid, methylmalonic acid, glutaric acid, succinic acid, methylsuccinic acid, methylenesuccinic acid, citraconic acid, or any combination of these. Example organic acid anhydrides include, but are not limited to glutaric anhydride, succinic anhydride, methylsuccinic anhydride, maleic anhydride, itaconic anhydride, or any combination of these. Other acidic species examples are described above. Useful acidic species include, but are not limited to, those exhibiting a $pK_a$ of between −10 and 7, between −5 and 6, between 1 and 6, between 1.2 and 5.6, or about 4. The acidic species may optionally be present in the electrolyte at any suitable concentration, such as from 0.01 wt. % to 10 wt. %, from 0.1 wt. % to 10 wt. %, from 1 wt. % to 5 wt. %, or from 3 wt. % to 5 wt. %.

It will be appreciated that lithium metal salts, such as $LiPF_6$, $LiAsF_6$, $LiClO_4$, $LiBF_4$, $LiCF_3SO_3$, may be useful components of the disclosed acidified electrolytes. Example solvents include, but are not limited to, ethylene carbonate, butylene carbonate, propylene carbonate, vinylene carbonate, dimethyl carbonate, diethyl carbonate, dipropyl carbonate, ethylmethyl carbonate, methylpropyl carbonate, ethylpropyl carbonate, fluoroethylene carbonate and mixtures thereof. Example solvents may be useful in metal ion batteries, such as lithium ion batteries.

The foregoing, together with other features and embodiments, will become more apparent upon referring to the following description, claims, and accompanying drawings. For example, further details of the disclosed batteries and methods of making batteries are described in the below detailed description.

BRIEF DESCRIPTION OF THE DRAWINGS

FIG. 3 provides X-ray photoelectron spectroscopy (XPS) data showing surface functionalization arising endogeneously from the synthesis method disclosed herein. Numbers shown are atomic concentrations in percent. The far right column lists the corresponding pH of the synthesized nanoparticles as measured when dispersed at 5 wt % in aqueous solution.

FIG. 7 provides X-ray photoelectron spectroscopy analysis of the surface of AMO nanoparticles synthesized using both a strong (phosphorous containing) and weak (acetate) electron withdrawing group shows greater atomic concentration of phosphorous than of the bonds associated with acetate groups.

DEFINITIONS

Figure 1:
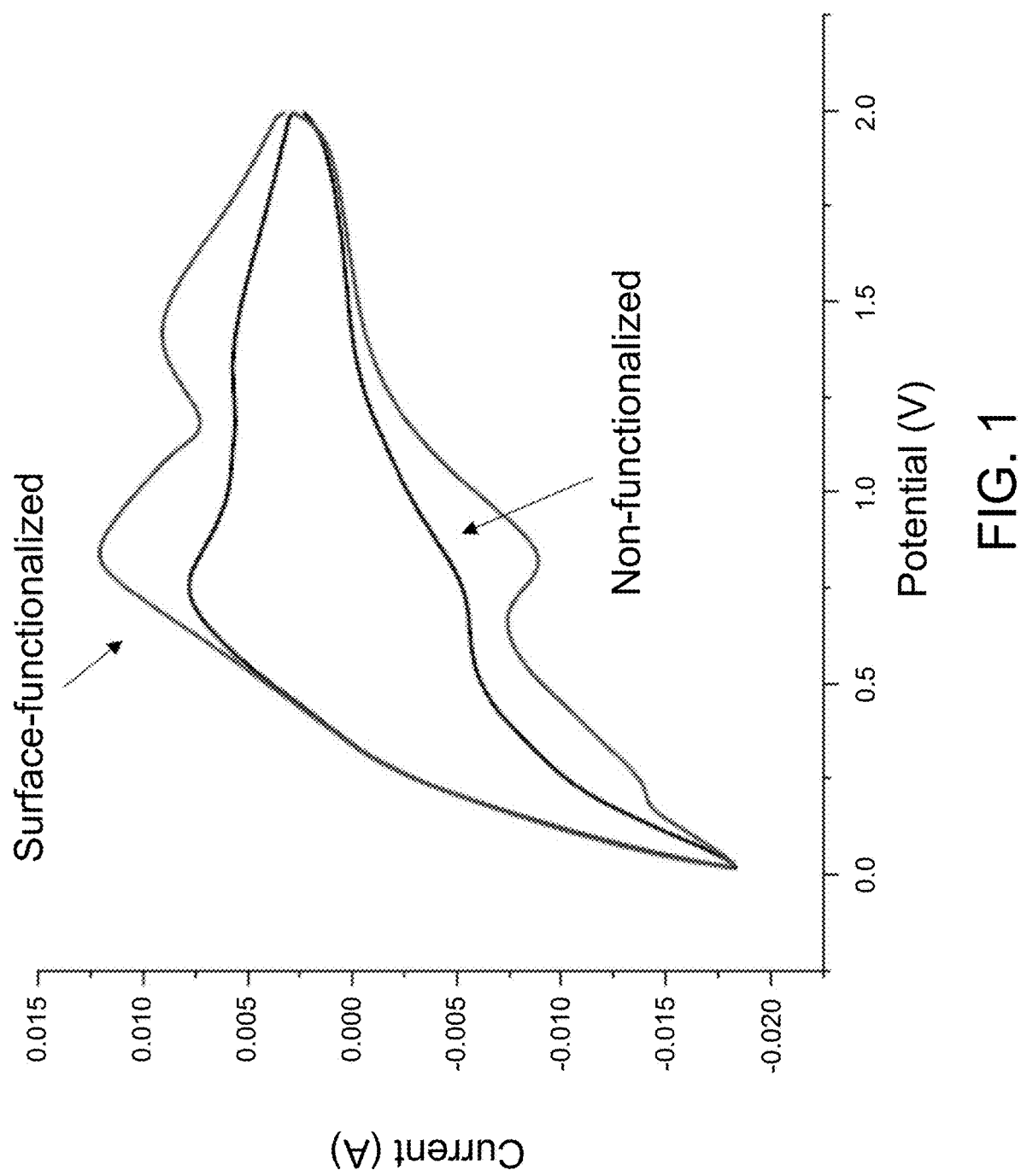
FIG. 1 provides a plot showing differences in the cyclic voltammogram of AMO tin prepared by the method disclosed herein relative to that of commercially available non-AMO tin, when cycled against Li.

For the purposes of this disclosure, the following terms have the following meanings:

Acidic oxide—a term used generally in the scientific literature to refer to binary compounds of oxygen with a nonmetallic element. An example is carbon dioxide, $CO_2$. The oxides of some metalloids (e.g., Si, Te, Po) also have weakly acidic properties in their pure molecular state.

Acidified metal oxide ("AMO") or AMO material—terms used herein to denote binary compounds of oxygen with a metallic element which has been synthesized or modified to have an acidity greater than that of its natural mineralogical state and also a Hammet function, $H_0$, greater than −12 (i.e., not superacidic). It will be appreciated that AMOs may have a surface pH less than 7, such as when suspended in water (or resuspended in water after drying) at 5 wt. %. Optionally, AMOs may exhibit a surface pH less than 6, less than 5, less than 4 or less than 3. The average particle size of the AMOs disclosed herein is also less than that of the natural mineralogical state. For example AMOs may comprise nanomaterials, such as particles having at least one dimension less than 100 nm, less than 20 nm, less than 10 nm, or falling between 1 and 100 nm. Naturally occurring mineralogical forms do not occur as nanomaterials and do not fall within the scope of the inventive AMO material. A synthesized metal oxide, however, that is more acidic than its most abundant naturally occurring mineralogical form (of equivalent stoichiometry) but not superacidic may fall within the bounds of this disclosure and can be said to be an AMO material provided it satisfies certain other conditions discussed in this disclosure.

Acidic—a term used generally in the scientific literature to refer to compounds having a pH of less than 7 in aqueous solution.

Electron-withdrawing group ("EWG")—an atom or molecular group that draws electron density towards itself. The strength of the EWG is based upon its known behavior in chemical reactions. Halogens, for example are known to be strong EWGs. Organic acid groups such as acetate are known to be weakly electron withdrawing.

Hammet function—An additional means of quantifying acidity in highly concentrated acid solutions and in superacids, the acidity being defined by the following equation: $H_0 = _pK_{BH+} + \log([B]/[BH^+])$. On this scale, pure 18.4 molar $H_2SO_4$ has a $H_0$ value of $-12$. The value $H_0 = -12$ for pure sulfuric acid must not be interpreted as pH=$-12$, instead it means that the acid species present has a protonating ability equivalent to $H_3O^+$ at a fictitious (ideal) concentration of $10^{12}$ mol/L, as measured by its ability to protonate weak bases. The Hammett acidity function avoids water in its equation. It is used herein to provide a quantitative means of distinguishing the AMO material from superacids. The Hammet function can be correlated with colorimetric indicator tests and temperature programmed desorption results.

Metal oxide—a term used generally in the scientific literature to refer to binary compounds of oxygen with a metallic element. Depending on their position in the periodic table, metal oxides range from weakly basic to amphoteric (showing both acidic and basic properties) in their pure molecular state. Weakly basic metal oxides are the oxides of lithium, sodium, magnesium, potassium, calcium, rubidium, strontium, indium, cesium, barium, and tellurium. Amphoteric oxides are those of beryllium, aluminum, gallium, germanium, astatine, tin, antimony, lead, and bismuth. These and other metal oxides may optionally be useful as AMO materials.

Monodisperse—characterized by particles of uniform size which are substantially separated from one another, not agglomerated as grains of a larger particle.

pH—a functional numeric scale used generally in the scientific literature to specify the acidity or alkalinity of an aqueous solution. It is the negative of the logarithm of the concentration of the hydronium ion $[H_3O^+]$. As used herein, pH may be used to describe the relative acidity of nanoparticles suspended in aqueous solution.

Surface functionalization—attachment of small atoms or molecular groups to the surface of a material.

Superacid—substances that are more acidic than 100% $H_2SO_4$, having a Hammet function, $H_0$, less than $-12$.

DETAILED DESCRIPTION OF THE PREFERRED EMBODIMENTS

Described herein are acidified metal oxide ("AMO") materials useful in applications such as a battery electrode or photovoltaic component, in which the AMO material is used in conjunction with one or more acidic species. Advantageously, batteries constructed of AMO materials and incorporating acidic species, such as in the electrode or electrolyte components of the battery may allow for improving the capacity of a battery as compared to a corresponding battery lacking the acidic species. The acidic species may enhance the utility of the AMO materials, such as by modulating more acidity or reactivity of the AMO surface or by creating more favorable electronic interactions of the AMO materials or the surface thereof with adjacent or interacting substances.

The surfaces of metal oxides are ideally arrays of metal and oxygen centers, ordered according to the crystalline structure of the oxide. In reality the arrays are imperfect, being prone to vacancies, distortion, and the effects of surface attachments. Regardless, any exposed metal centers are cationic (positively charged) and can accept electrons, thus functioning by definition as Lewis acid sites. Oxygen centers are anionic (negatively charged) and act as Lewis base sites to donate electrons. This allows metal oxide surfaces to behave in an amphoteric fashion.

Under normal atmospheric conditions, the presence of water vapor will adsorb to the metal oxide surface either molecularly (hydration) or dissociatively (hydroxylation). Both $OH^-$ and $H^+$ species can adsorb on the oxide surface. The negatively-charged hydroxyl species will attach at the metal, cationic (Lewis acid, electron accepting) centers, and the $H^+$ will attach at the oxygen, anionic (Lewis base, electron donating) centers. Both adsorptions lead to the presence of the same functional group—a hydroxyl—on the metal oxide surface.

These surface hydroxyl groups can serve as either Brønsted acids or as Brønsted bases, because the groups can either give up or accept a proton. The tendency of an individual hydroxyl group to be a proton donor or a proton acceptor is affected by the coordination of the metal cation or oxygen anion to which it is attached. Imperfections of the metal oxide surface such as oxygen vacancies, or coordination of the surface groups with other chemical species, mean that all cations and anions are not equally coordinated. Acid-base sites will vary in number and in strengths. When broadly "totaled" across the surface of the oxide, this can give the surface an overall acidic or basic character.

The quantity and strength of Lewis acid and base sites—from the exposed metal cations and oxygen anions, respectively) and Brønsted acid and base sites (from the surface hydroxyl groups)—add broad utility and functionality to the metal oxide and its use in both chemical reactions and device applications. The sites are a strong contributor to the chemical reactivity of the metal oxide. They can serve as anchor sites to which other chemical groups, and even additional metal oxides, may be attached. And they can affect surface charge, hydrophilicity and biocompatibility.

One way of altering the surface of metal oxides is to attach small chemical groups or electron-withdrawing groups ("EWGs") in a process known as surface functionalization. The EWG induces polarization of the hydroxide bonds and facilitates dissociation of hydrogen. For example, a stronger EWG should lead to a more polarized bond and therefore a more acidic proton. The acidity of Lewis sites can be increased by inducing polarization that facilitates the donation of electrons to the site. When compounds so made are placed in water, the acidic protons will dissociate and so reduce the aqueous pH measurement.

Though somewhat imprecise when working with solid acid/base systems rather than liquid ones, traditional methods of pH measurement utilizing titrations, pH paper, and pH probes can be used to evaluate the acidity of metal oxides dispersed in aqueous solution. These measurements can be supplemented by the use of techniques including but not limited to colorimetric indicators, infrared spectroscopy, and temperature programmed desorption data to establish the acidified nature of the metal oxide surface. Surface groups can be examined by standard analytical techniques including but not limited to x-ray photoelectron spectroscopy.

Surface functionalization can be accomplished post-synthesis, including, but not limited to, exposing the metal oxide to acidic solutions or to vapors containing the desired functional groups. It can also be accomplished via solid state methods, in which the metal oxide is mixed and/or milled with solids containing the desired functional groups. However, all of these methods require an additional surface functionalization step or steps beyond those required to synthesize the metal oxide itself.

Synthesis and surface functionalization of the AMO material may be accomplished in a "single-pot" hydrothermal synthesis method or its equivalent in which the surface of the metal oxide is functionalized as the metal oxide is being synthesized from appropriate precursors. A precursor salt containing an EWG is solubilized and the resulting solution is acidified using an acid containing a second EWG. This acidified solution is then basified and the basified solution is heated then washed. A drying step produces the solid AMO material.

By way of example, an example AMO form of tin oxide was synthesized and simultaneously surface functionalized using the following single-pot method:
1. Initially, seven grams (7 g) of a tin (II) chloride dihydrate ($SnCl_2 \cdot 2H_2O$) is dissolved in a solution of 35 mL of absolute ethanol and 77 mL distilled water.
2. The resulting solution is stirred for 30 minutes.
3. The solution is acidified by the addition of 7 mL of 1.2 M HCl, added dropwise, and the resulting solution is stirred for 15 minutes.
4. The solution is basified by the addition of 1 M of an aqueous base, added dropwise until the pH of the solution is about 8.5.
5. The resulting opaque white suspension is then placed in a hot-water bath (~60 to 90° C.) for at least 2 hours while under stirring.
6. The suspension is then washed with distilled water and with absolute ethanol.
7. The washed suspension is dried at 100° C. for 1 hour in air and then annealed at 200° C. for 4 hours in air.

This method results in an AMO of tin, surface-functionalized with chlorine, whose pH is approximately 2 when measured in an aqueous solution at 5 wt. % and room temperature. By definition, its Hammet function, $H_0$ is greater than −12. Although an open system such as a flask is described here, a closed system such as an autoclave may also be used.

It will be appreciated that the method's parameters can be varied. These parameters include, but are not limited to, type and concentration of reagents, type and concentration of acid and base, reaction time, temperature and pressure, stir rate and time, number and types of washing steps, time and temperature of drying and calcination, and gas exposure during drying and calcination. Variations may be conducted singly, or in any combination, preferably using experimental design methodologies. Additionally, other metal oxide synthesis methods—e.g., spray pyrolysis methods, vapor phase growth methods, electrodeposition methods, solid state methods, and hydro- or solvo thermal process methods—may be useful for achieving the same or similar results as the method disclosed here.

Figure 2:
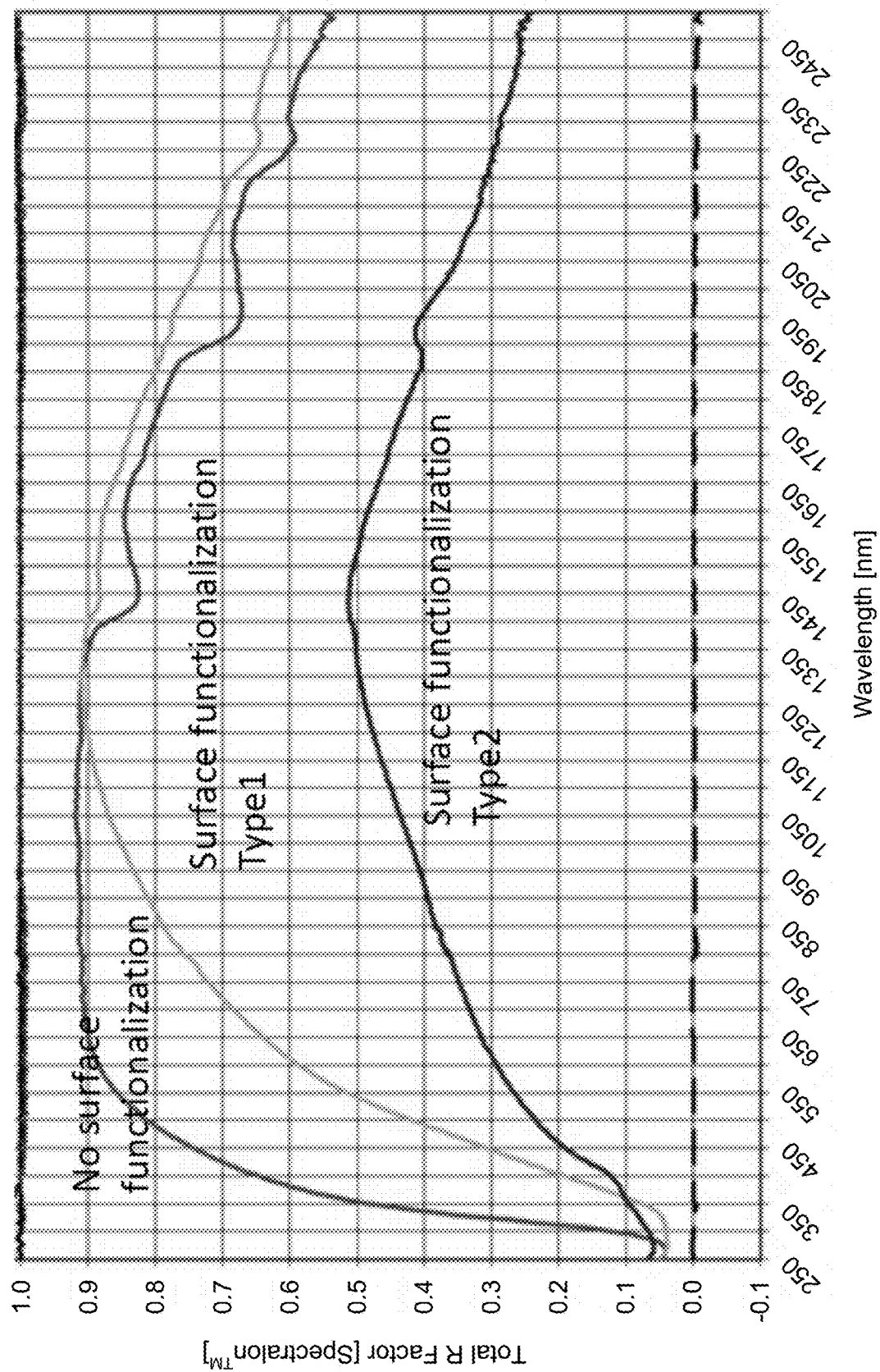
FIG. 2 provides a plot showing that the total reflectance of AMO tin oxide is different than that of commercially available non-AMO tin oxide.

The performance characteristics of the AMO nanomaterial differ from those of non-acidified metal oxide nanoparticles. As one example, FIG. 1 shows differences in the cyclic voltammogram of AMO tin prepared by the single-pot method relative to that of commercially available, non-AMO tin when cycled against Li. As another example, FIG. 2 shows the total reflectance of AMO tin oxide is different than that of commercially available, non-AMO tin oxide. The data indicates that the AMO has a lower band gap and therefore more desirable properties as a component of a photovoltaic system.

The AMO material may be represented by the formula $$M_mO_x/G$$

where $M_mO_x$ is the metal oxide, m being at least 1 and no greater than 5, x being at least 1 and no greater than 21; G is at least one EWG that is not hydroxide; and "/" makes a distinction between the metal oxide and the EWG, denoting no fixed mathematical relationship or ratio between the two. G may represent a single type of EWG, or more than one type of EWG.

Example AMOs are acidified tin oxides ($Sn_xO_y$), acidified titanium dioxides ($Ti_aO_b$), acidified iron oxides ($Fe_cO_d$), and acidified zirconium oxide ($Zr_eO_f$). Preferred electron-withdrawing groups ("EWGs") are Cl, Br, $BO_3$, $SO_4$, $PO_4$, $NO_3$, and $CH_3COO$. Regardless of the specific metal or EWG, the AMO material is acidic but not superacidic, yielding a pH less than 7 when suspended in an aqueous solution at 5 wt. % and a Hammet function, $H_0$ greater −12, at least on its surface.

The AMO material structure may be crystalline or amorphous (or a combination thereof), and may be utilized singly or as composites in combination with one another, with non-acidified metal oxides, or with other additives, binders, or conductive aids known in the art. The AMO material may be added to a conductive aid material such as graphite or conductive carbon (or their equivalents) in a range of 10 wt. % to 80 wt. % and upwards of 90 wt. % to 95 wt. %. Optionally, the AMO is added at 10 wt. %, 33 wt. %, 50 wt. %, or 80 wt. %.

To maximize the amount of overall surface area available, the AMO may be present in nanoparticulate form (i.e., less than 1 micron in size) and substantially monodispersed. Optionally, the nanoparticulate size is less than 100 nm and, may be smaller still, such as less than 20 nm or 10 nm. It will be appreciated that nanoparticulate sizes ranging from 1 nm to 100 nm or 1000 nm may be useful with certain AMOs.

Mixed-metal AMOs, in which another metal or metal oxide is present in addition to the simple, or binary oxide, also have been reduced to practice. These mixed-metal AMOs may be represented by the formula $$M_mN_nO_x/G \text{ and } M_mN_nR_rO_x/G$$

where M is a metal and m is at least 1 and no greater than 5; N is a metal and n is greater than zero and no greater than 5; R is a metal and r is greater than zero and no greater than 5; O is total oxygen associated with all metals and x is at least 1 and no greater than 21; "/" makes a distinction between the metal oxide and an EWG, denoting no fixed mathematical relationship or ratio between the two; and G is at least one EWG that is not hydroxide. G may represent a single type of EWG, or more than one type of EWG.

Some prior art mixed metal oxide systems, of which zeolites are the most prominent example, display strong acidity even though each simple oxide does not. Preferred embodiments of the mixed-metal AMO of this disclosure differ from those systems in that any embodiment must include at least one AMO which is acidic (but not super-acidic) in simple $M_mO_x/G$ form. Example mixed metal and metal oxide systems include $Sn_xFe_cO_{y+d}$ and $Sn_xTi_aO_{y+b}$, where y+d and y+b may be an integer or non-integer value.

Optionally, the mixed metal AMO material is produced via the single-pot method with one modification: synthesis begins with two metal precursor salts rather than one, in any proportion. For example, Step 1 of the single-pot method described above may be altered as follows: Initially, 3.8 g of tin (II) chloride dihydrate ($SnCl_2 \cdot 2H_2O$) and 0.2 g of lithium chloride (LiCl) are dissolved in a solution of 20 mL of absolute ethanol and 44 mL distilled water.

Three metal precursor salts may optionally be used, in any proportion. The metal precursor salts may have the same or differing anionic groups, depending on the desired product. The metal precursor salts may be introduced at different points in the synthesis. The metal precursor salts may be introduced as solids or introduced in a solvent.

Experimentation with the single-pot method led to seven key findings. First, in all cases both surface functionalization and acidity arise endogenously (see FIG. 3), rather than created post-synthesis. Unlike prior art surface functionalization methods, the single-pot method does not require any additional step or steps for surface functionalization beyond those required to synthesize the metal oxide itself, nor does it make use of hydroxyl-containing organic compounds or hydrogen peroxide.

Second, the method is broadly generalizable across a wide range of metal oxides and EWGs. Using the method, metal oxides of iron, tin, antimony, bismuth, titanium, zirconium, manganese, and indium have been synthesized and simultaneously surface-functionalized with chlorides, sulfates, acetates, nitrates, phosphates, citrates, oxalates, borates, and bromides. Mixed metal AMOs of tin and iron, tin and manganese, tin and manganese and iron, tin and titanium, indium and tin, antimony and tin, aluminum and tin, lithium and iron, and lithium and tin also have been synthesized. Additionally, surface functionalization can be accomplished using EWGs that are weaker than halogens and $SO_4$, yet still produce acidic but not superacidic surfaces. For example, the method also has been used to synthesize AMOs surface-functionalized with acetate ($CH_3COO$), oxalate ($C_2O_4$), and citrate ($C_6H_5O_7$).

Figure 4:
FIG. 4 provides electron micrograph images showing differences in morphology between AMO nanoparticles synthesized under identical conditions except for the use of a different group for functionalization.
Figure 4:
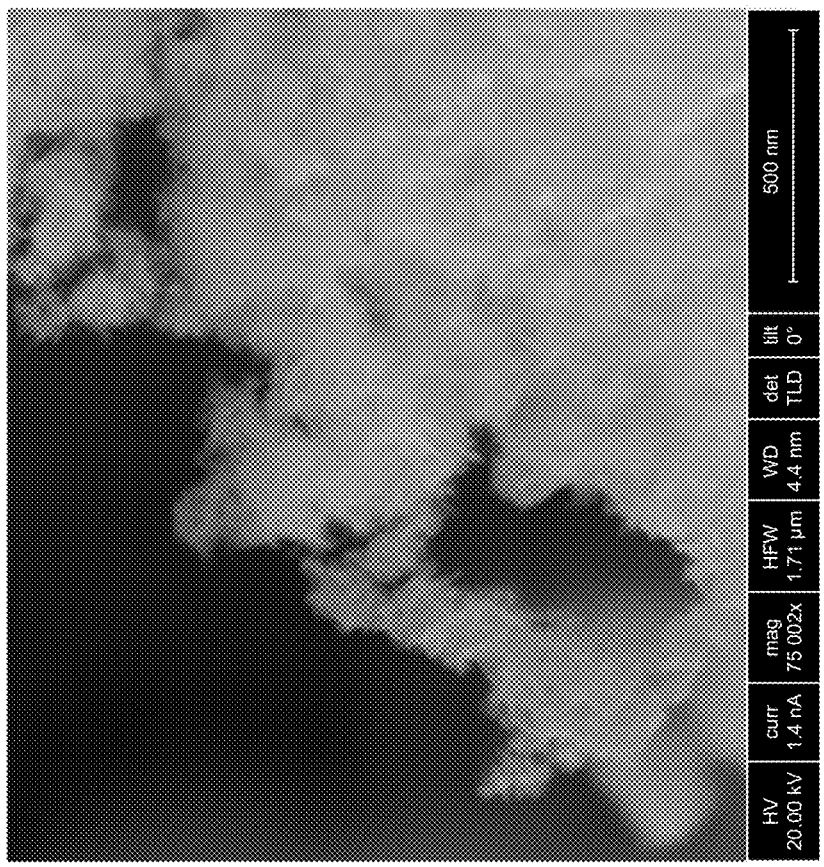

Third, there is a synergistic relationship between the EWG and other properties of the nanoparticles such as size, morphology (e.g., plate-like, spherical-like, needle- or rod-like), oxidation state, and crystallinity (amorphous, crystalline, or a mixture thereof). For example, differences in morphology can occur between AMO nanoparticles synthesized under identical conditions except for the use of a different EWG for surface functionalization, as illustrated in FIG. 4, which provides electron micrograph images of two AMOs generated using different EWGs. The surface functionalization may act to "pin" the dimensions of the nanoparticles, stopping their growth. This pinning may occur on only one dimension of the nanoparticle, or in more than one dimension, depending upon exact synthesis conditions.

Figure 5:
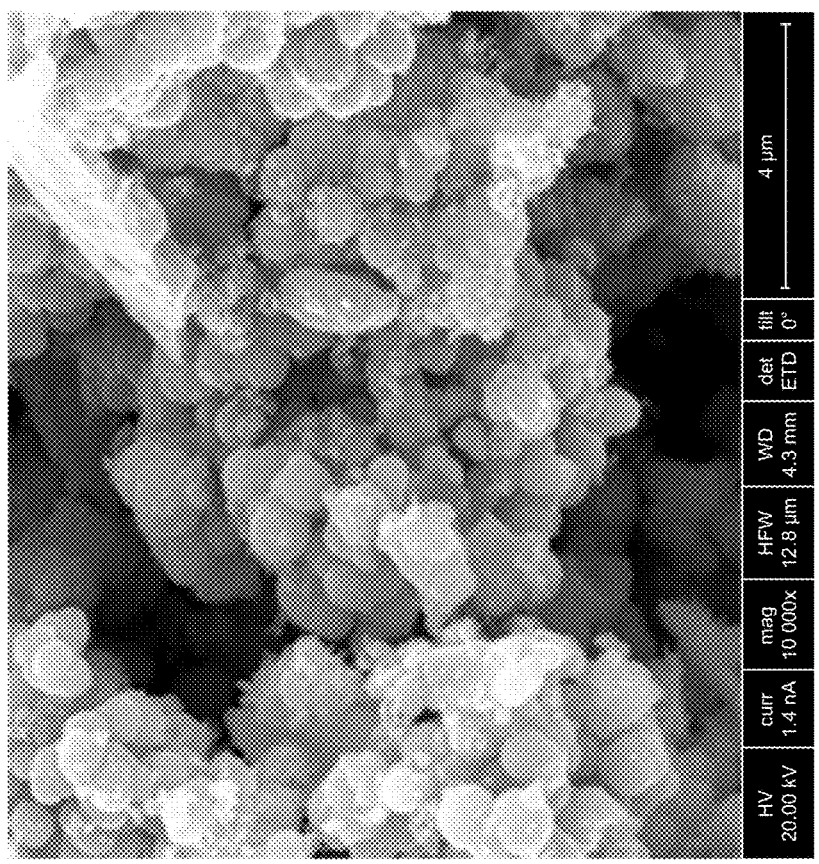
FIG. 5 provides electron micrograph images showing difference in morphology of AMO nanoparticles synthesized under identical conditions except for having two different total reaction times.
Figure 5:
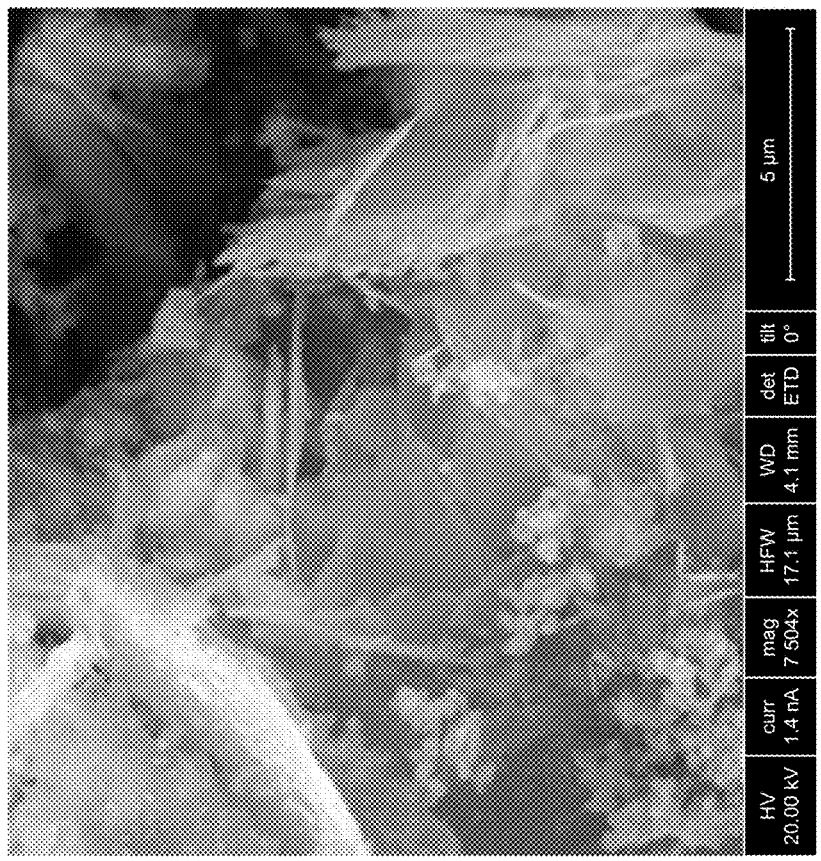
Figure 6:
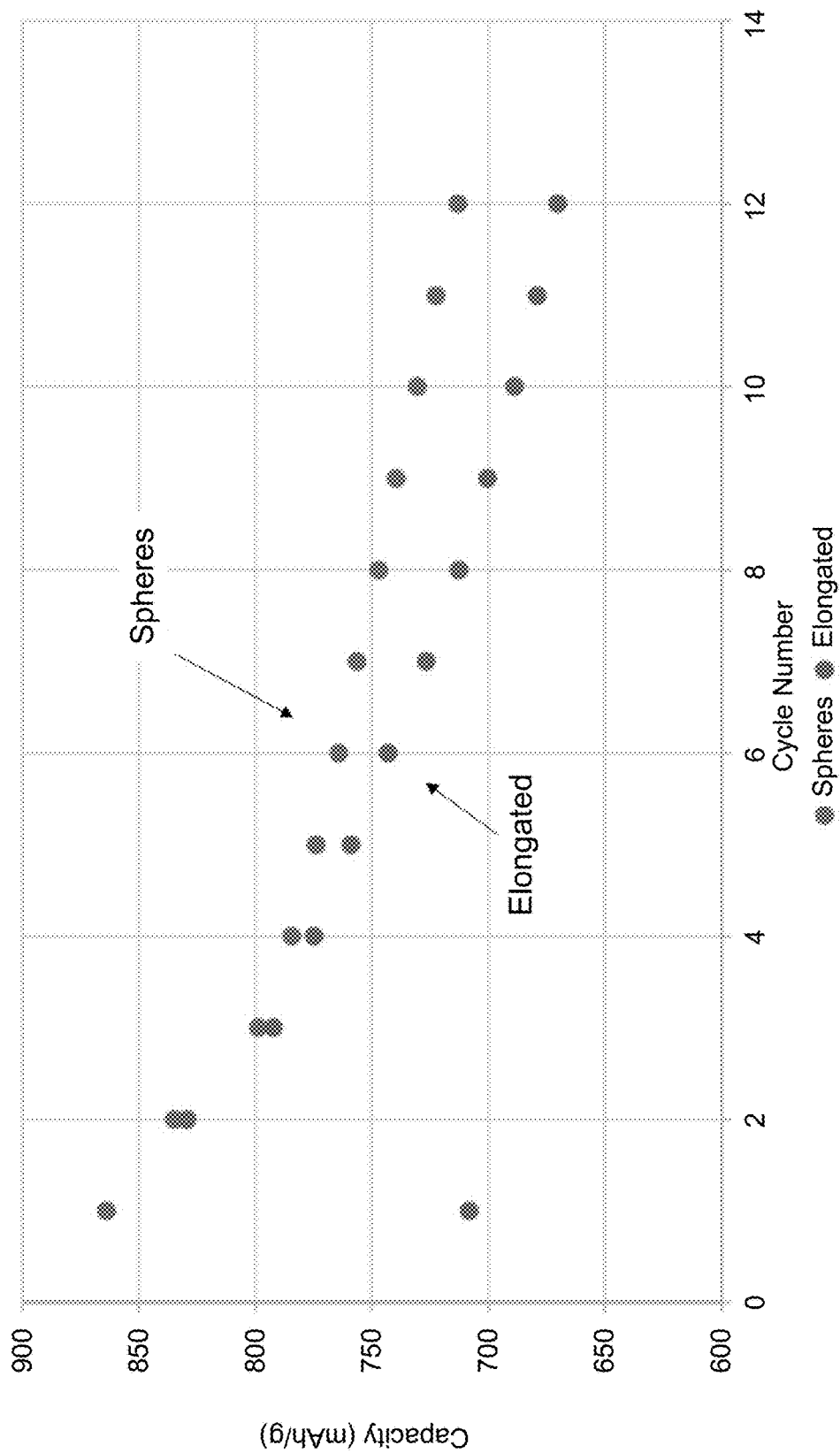
FIG. 6 provides representative half-cell data showing differences in behavior between spherical and elongated (needle-like or rod-like) AMOs upon cycling against lithium.

Fourth, the character of the AMO is very sensitive to synthesis conditions and procedures. For example, differences in morphology and performance of the AMO's nanoparticles can occur when synthesized under identical conditions except for having two different total reaction times. For example, FIG. 5 provides electron micrograph images of two AMOs reacted for different total reaction times, and FIG. 6 provides a plot of capacity (mAh/g) versus cycle number, showing a comparison of cyclability of two AMOs reacted for different total reaction times exhibiting different morphology. Experimental design methodologies can be used to decide the best or optimal synthesis conditions and procedures to produce a desired characteristic or set of characteristics.

Fifth, both the anion present in the precursor salt and the anion present in the acid contribute to the surface functionalization of the AMO. In one embodiment, tin chloride precursors and hydrochloric acid are used in a synthesis of an AMO of tin. The performance of these particles differ from an embodiment in which tin chloride precursors and sulfuric acid are used, or from an embodiment in which tin sulfate precursors and hydrochloric acid are used. Matching the precursor anion and acid anion may be advantageous for some embodiments.

Sixth, when utilizing a precursor with a weak EWG and an acid with a strong EWG, or vice versa, the strongly withdrawing anion will dominate the surface functionalization. This opens up a broader range of synthesis possibilities, allowing functionalization with ions that are not readily available in both precursor salts and acids. It may also permit mixed functionalization with both strong and weak EWGs. In one example, a tin acetate precursor and phosphoric acid are used to synthesize an AMO of tin. X-ray photoelectron spectroscopy analysis of the surface shows a greater atomic concentrations of phosphorous than of the bonds associated with acetate groups (see FIG. 7).

Figure 8A:
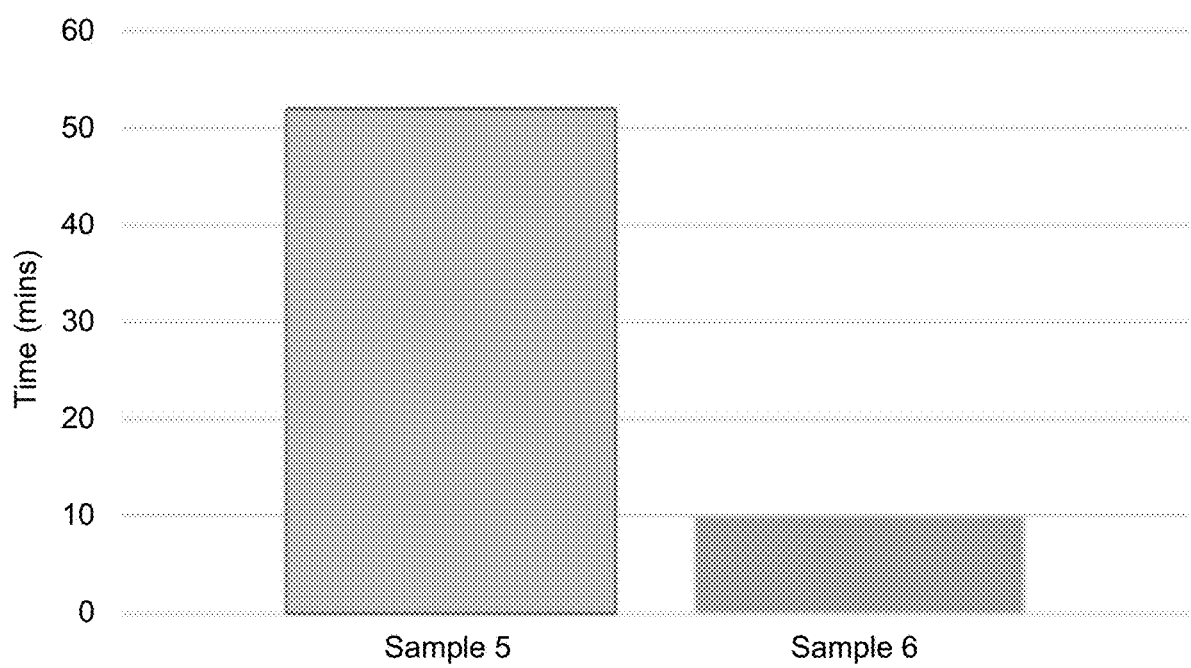
FIG. 8A provides data showing visible light activity degradation data for different AMOs.
Figure 8B:
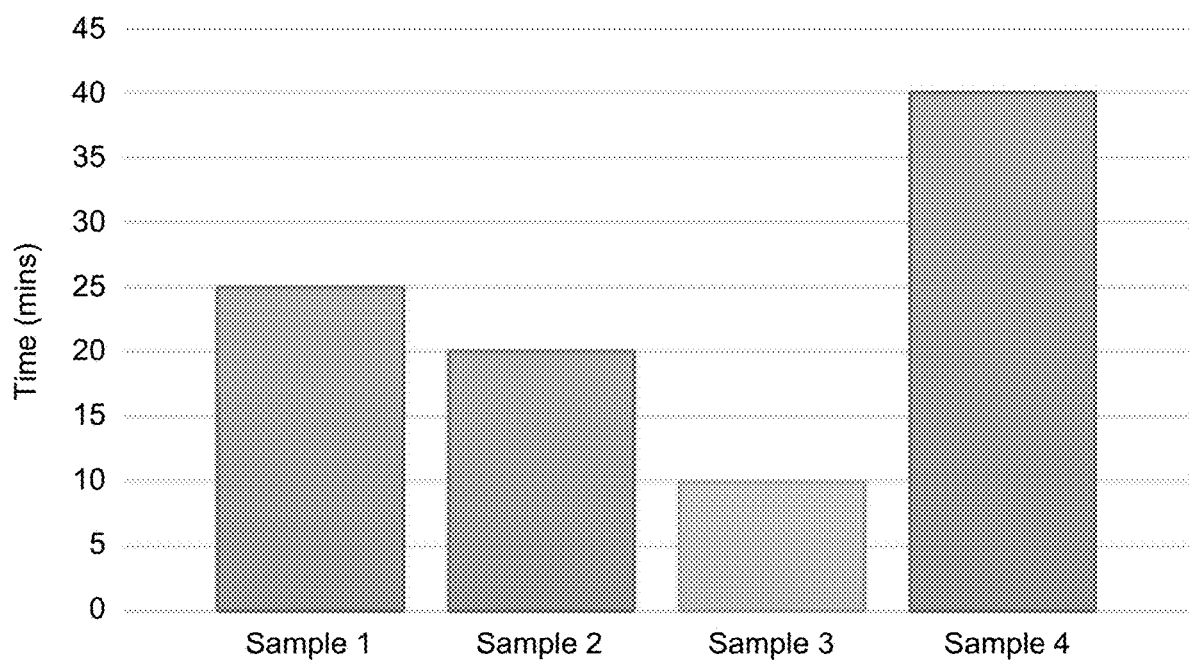
FIG. 8B provides data showing ultraviolet light activity degradation data for different AMOs.

Seventh, while the disclosed method is a general procedure for synthesis of AMOs, the synthesis procedures and conditions may be adjusted to yield sizes, morphologies, oxidation states, and crystalline states as are deemed to be desirable for different applications. As one example, catalytic applications might desire an AMO material which is more active in visible light or one which is more active in ultraviolet light. FIG. 8A provides visible light exposure degradation times of methylene blue when exposed to two different AMO materials. FIG. 8B provides ultraviolet light exposure degradation times of methylene blue when exposed to four different AMO materials.

Figure 9:
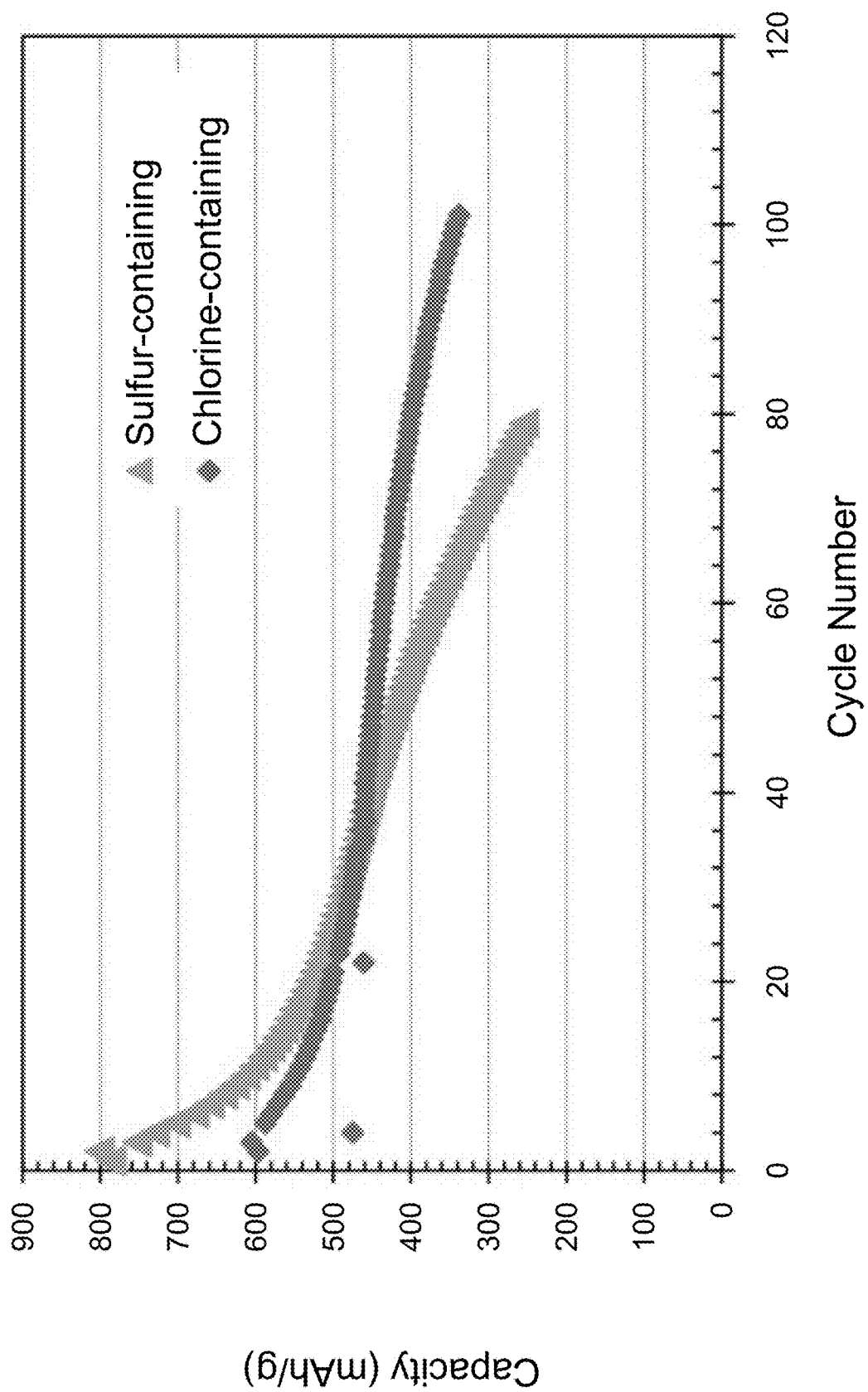
FIG. 9 provides data comparing two AMOs, one having higher capacity for use in a primary (single use) battery application and the other having higher cyclability for use in a secondary (rechargeable) battery application.
Figure 10:
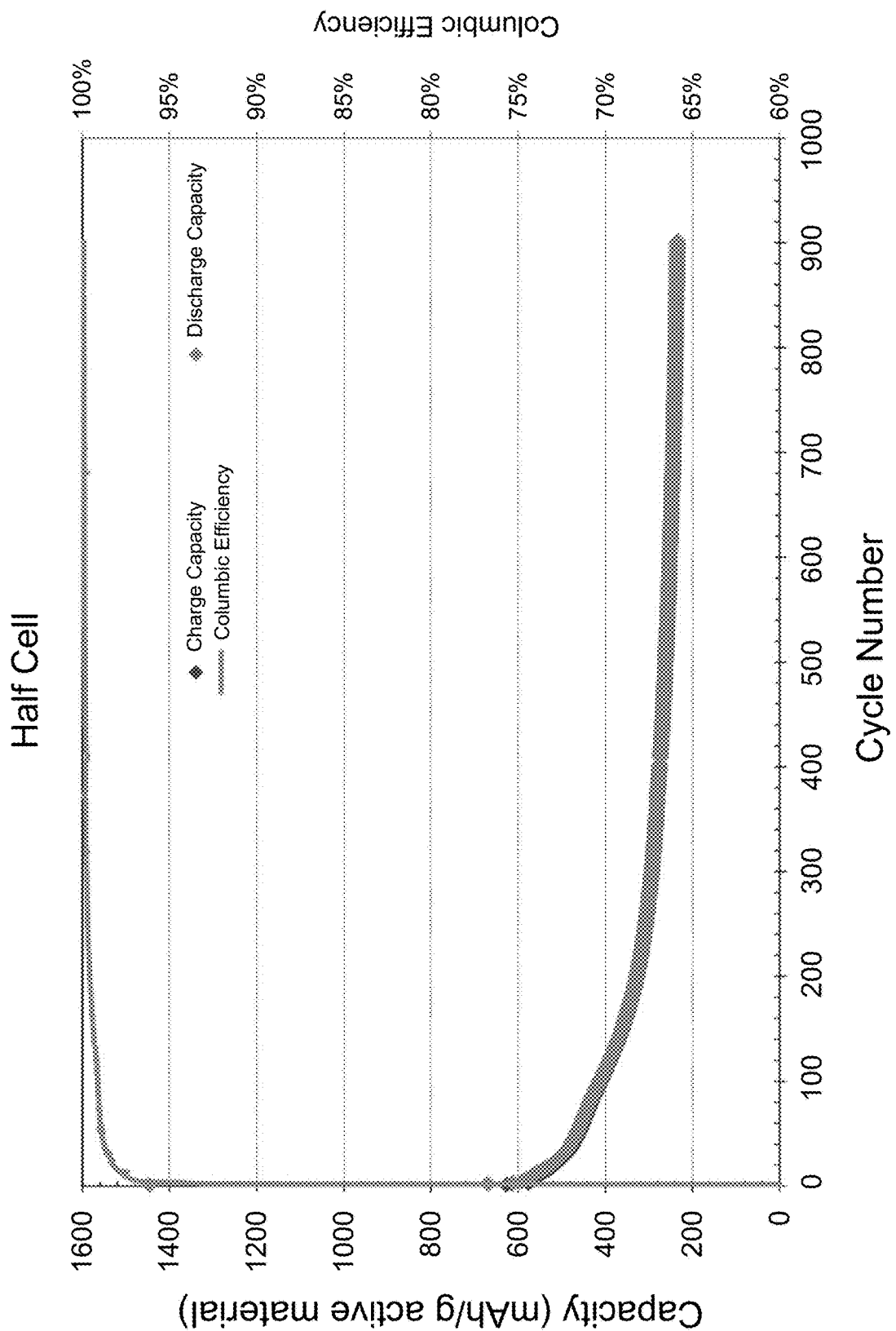
FIG. 10 provides charge and discharge capacity data and Columbic efficiency data, illustrating that AMOs can result in enhanced battery performance, without deterioration of battery components or gas generation.

In another example, the AMO material may be used as a battery electrode. A primary (single-use) battery application might desire an AMO with characteristics that lead to the highest capacity, while a secondary (rechargeable) battery application might desire the same AMO but with characteristics that lead to the highest cyclability. FIG. 9 compares the cyclability of two different batteries constructed from AMO materials, including a chlorine containing AMO and a sulfur containing AMO. The AMO material can result in enhanced battery performance, without deterioration of battery components or gas generation (see FIG. 10). This is exactly opposite what the prior art teaches.

Figure 11:
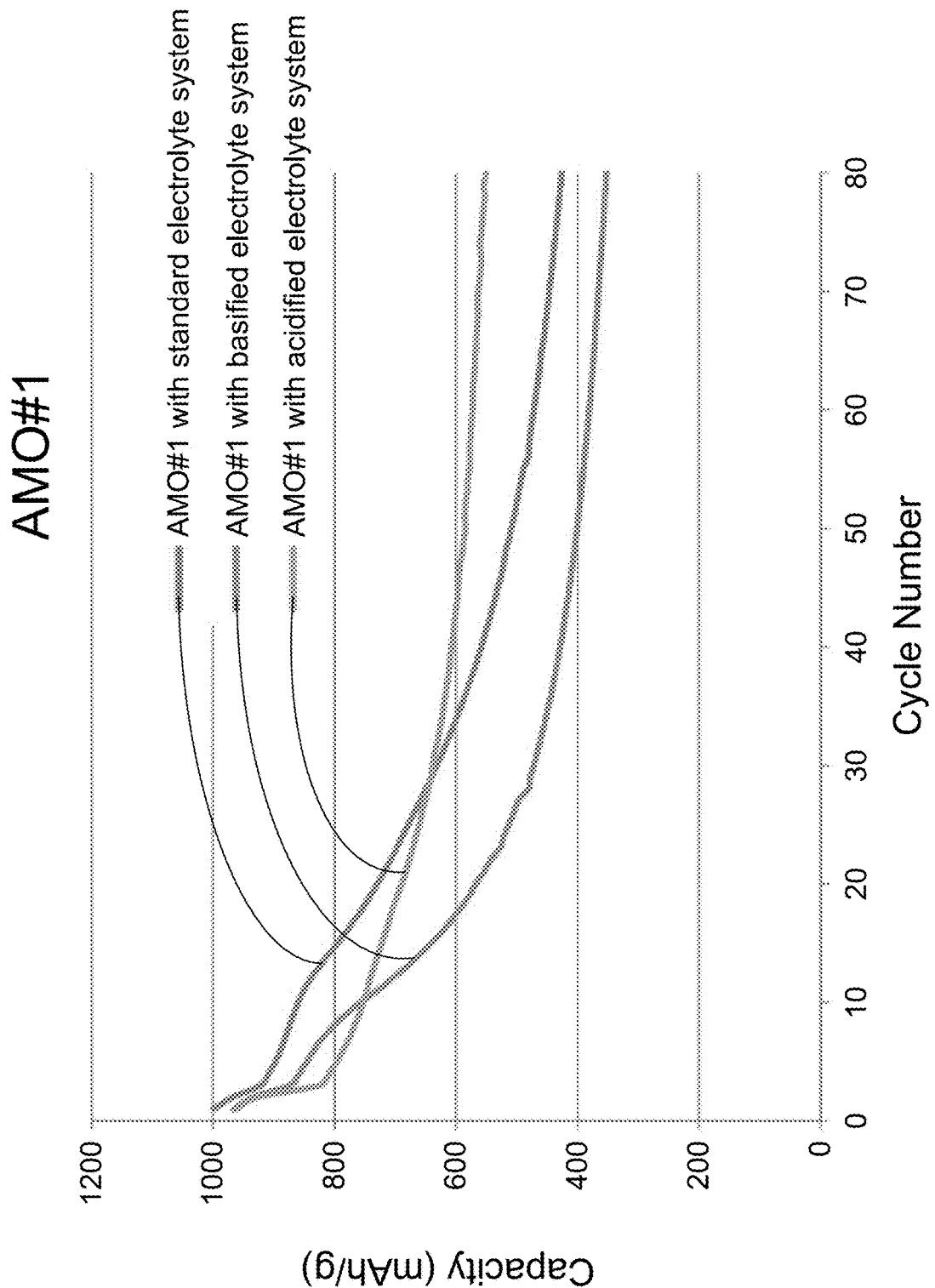
FIG. 11 shows capacity and cycling data for an AMO in standard, acidified, and basified electrolyte systems.

Advantageously, the AMO material may optionally be used with an acidic binder, an acidic electrolyte, or an acidic electrolyte additive. The inventors have surprisingly found that including acidic species, such as organic acids or organic acid anhydrides, in a battery comprising an AMO material results in an increase in the capacity of versus batteries where the acidic species are not included. Again, the prior art teaches against use of acidic species, as these species may degrade metal current collectors and housings and cause deterioration in other electrode components. As shown in FIG. 11, which provides comparative cyclability data for AMO-based batteries formed of the same materials and structure except for one having a standard electrolyte, one having a basified electrolyte, and one having an acidified electrolyte. The batteries included a construction as follows: all cathodes included the same AMO material; all anodes were lithium metal; the standard electrolyte was 1:1:1 mix of dimethylene carbonate, diethylene carbonate, and ethylene carbonate with 1 M $LiPF_6$; the acidified electrolyte was the standard electrolyte with 3 wt. % succinic anhydride; the basified electrolyte was the standard electrolyte with 3 wt. % dimethylacetamide. All batteries were cycled at the same discharge rate. As illustrated, the battery with the acidified electrolyte system exhibits the best cycling ability, maintaining the highest capacity over the largest number of cycles.

Figure 12:
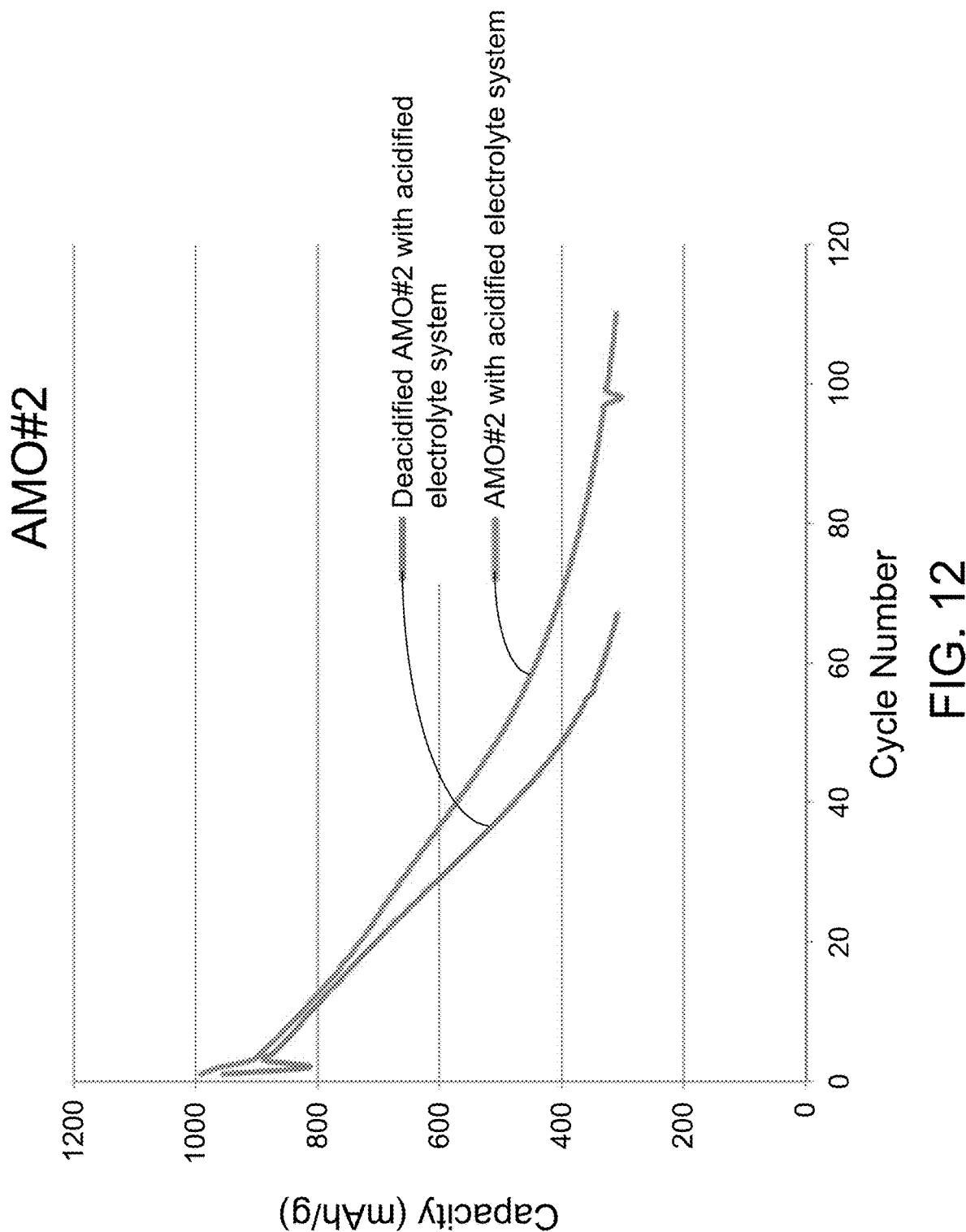
FIG. 12 shows capacity and cycling data for an AMO, and for the same AMO from which the acidification was removed by solvent washing.

FIG. 12 provides additional comparative cyclability data for two different batteries with the same battery construction including an acidified electrolyte, except that the AMO material of one battery is deacidified by washing with a solvent. The batteries included a construction as follows: the cathodes included the AMO material; the electrolyte was a 1:1:1 mix of dimethylene carbonate, diethylene carbonate, and ethylene carbonate with 1 M $LiPF_6$ and 3 wt. % succinic anhydride; the anodes were lithium metal. The batteries were cycled at the same discharge rate. The battery having the acidified AMO material performs better, indicating that the acidified surface of the AMO may interact with the acidified electrolyte, providing enhanced performance.

It will be appreciated that other battery constructions are possible using the AMO material and an acidic species as an additive to an electrode comprising the AMO material and/or to the electrolyte. For example, a battery may comprise a first electrode comprising an AMO nanomaterial, a second electrode, and an electrolyte positioned between the first electrode and the second electrode. As an example in a lithium ion battery, the first electrode may operate as a cathode or an anode. For example, in operation as a cathode, the second electrode may correspond to lithium metal, graphite, or another anodic material. As another example, in operation as an anode, the second electrode may correspond to a $LiCoO_2$, $LiMn_2O_4$, $LiNiO_2$, or another cathodic material. Useful materials for the second electrode include, but are not limited to, graphite, lithium metal, sodium metal, lithium cobalt oxide, lithium titanate, lithium manganese oxide, lithium nickel manganese cobalt oxide (NMC), lithium iron phosphate, lithium nickel cobalt aluminum oxide (NCA), or any combination of these.

Figure 13:
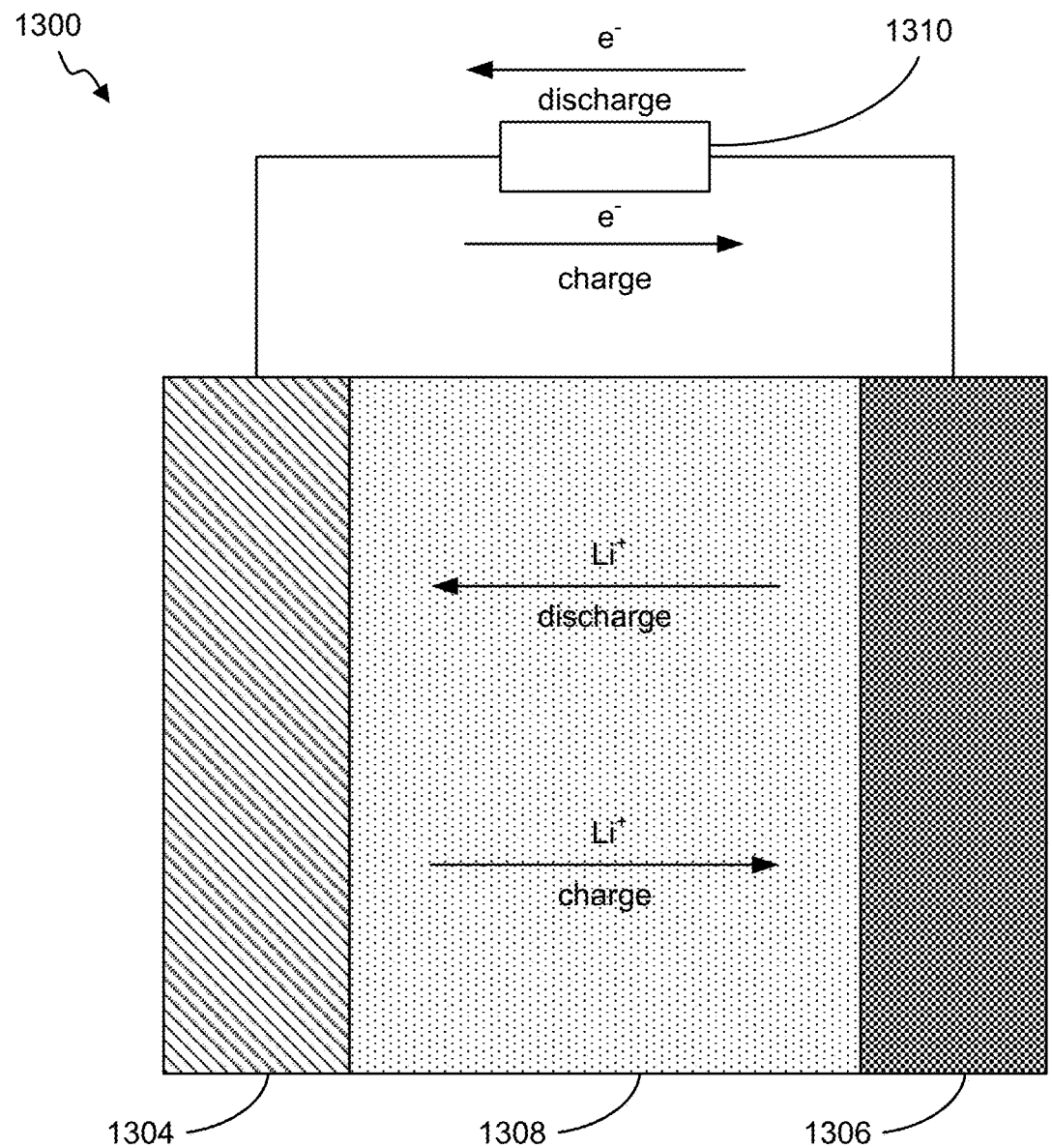
FIG. 13 provides a schematic illustration of an example battery.

FIG. 13 provides an example construction of a battery cell 1300 incorporating features described herein. Battery cell 1300 comprises a cathode 1304, an anode 1306 and an electrolyte 1308 between cathode 1304 and anode 1306. As an example, cathode 1304 may comprise an AMO material disclosed herein. Electrolyte 1308 may correspond to a known electrolyte solvent in which a salt of a working ion is dissolved. In addition to the dissolved salt, an acidic species is optionally dissolved in electrolyte 1308. Alternatively or additionally, an acidic species may be included in cathode 1304 in addition to the AMO material. In a lithium ion system, the dissolved salt may correspond to a lithium salt, such as $LiPF_6$, and the anode may correspond to lithium metal or a lithium intercalation material, such as graphite. An example acidic species may correspond to oxalic acid. Additional components, such as current collectors, separators, a case, etc., may be included in the battery cell 1300, but are not shown in FIG. 13.

During charging of battery cell 1300, element 1310 represents a voltage source that is applied between cathode 1304 and anode 1306, and ions are shuttled from cathode 1304 to the anode 1304 through electrolyte 1308, while electrons are transported from the anode to the cathode. In a lithium ion system, lithium ions are the working ion. During discharging of battery cell 1300, element 1310 represents a load that is applied between cathode 1304 and anode 1306, and ions are shuttled from anode 1306 to cathode 1304 through the electrolyte 1308.

Without wishing to be bound by any theory, it is believed that the presence of acidic species in the cathode 1304 and/or electrolyte 1308 improves a surface affinity of the AMO material toward lithium ions, resulting in an improved ability to take up lithium ions during discharge and overall improvement to capacity as compared to a similar cell lacking acidic species or having a basified cathode or electrolyte (i.e., including basic species). Alternatively or additionally, the presence of acidic species may allow for additional active sites for lithium uptake in cathode 1304.

STATEMENTS REGARDING INCORPORATION BY REFERENCE AND VARIATIONS

All references throughout this application, for example patent documents including issued or granted patents or equivalents, patent application publications, and non-patent literature documents or other source material, are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising,"

particularly in a description of components of a composition or in a description of elements of a device, is understood to encompass those compositions and methods consisting essentially of and consisting of the recited components or elements. The invention illustratively described herein suitably may be practiced in the absence of any element or limitation that is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the claims.

What is claimed is:

1. A lithium ion battery comprising:
   a cathode, wherein the cathode comprises an acidified metal oxide (AMO) nanomaterial as a lithium uptake cathode active material, wherein the AMO nanomaterial comprises nanoparticles of a metal oxide with electron withdrawing groups bound to a surface of the nanoparticles, wherein the electron withdrawing groups are selected from the group consisting of Cl, Br, $BO_3$, $SO_4$, $PO_4$, $NO_3$, $CH_3COO$, $C_2O_4$, and $C_6H_5O_7$;
   an anode comprising an anode active material; and
   an acidified electrolyte positioned between the cathode and the anode, wherein the acidified electrolyte comprises:
      a solvent;
      one or more lithium salts dissolved in the solvent; and
      an acidic species dissolved in the solvent, wherein the acidic species is different from the one or more lithium salts.

2. The lithium ion battery of claim 1, wherein the AMO nanomaterial exhibits a pH less than 7 and a Hammet function, $H_0$, greater than −12 when suspended in water at 5 wt. %.

3. The lithium ion battery of claim 1, wherein the AMO nanomaterial comprises acidified tin oxide.

4. The lithium ion battery of claim 1, wherein the AMO nanomaterial comprises acidified iron oxide.

5. The lithium ion battery of claim 1, wherein the AMO nanomaterial comprises acidified zirconium oxide.

6. The lithium ion battery of claim 1, wherein the AMO nanomaterial comprises acidified titanium dioxide.

7. The lithium ion battery of claim 1, wherein the anode comprises graphite or lithium metal.

8. The lithium ion battery of claim 1, wherein the acidic species comprises:
   one or more organic acids selected from the group consisting of oxalic acid, acetic acid, maleic acid, methylmalonic acid, glutaric acid, succinic acid, methylsuccinic acid, methylenesuccinic acid, and citraconic acid, or
   one or more organic acid anhydrides selected from the group consisting of glutaric anhydride, methylsuccinic anhydride, and itaconic anhydride.

9. The lithium ion battery of claim 1, wherein the acidic species comprises citric acid or succinic anhydride.

10. A method of making a lithium ion battery, comprising:
    making an acidified metal oxide (AMO) nanomaterial, wherein the AMO nanomaterial comprises nanoparticles of a metal oxide with electron withdrawing groups bound to a surface of the nanoparticles, wherein the electron withdrawing groups are selected from the group consisting of Cl, Br, $BO_3$, $SO_4$, $PO_4$, $NO_3$, $CH_3COO$, $C_2O_4$, and $C_6H_5O_7$;
    forming a cathode using the AMO nanomaterial as a lithium uptake cathode active material; and
    positioning an acidified electrolyte between the cathode and an anode, the anode comprising an anode active material, and the acidified electrolyte comprising:
       a solvent,
       one or more lithium salts dissolved in the solvent, and
       an acidic species dissolved in the solvent, wherein the acidic species is different from the one or more lithium salts.

11. The method of claim 10, wherein the AMO nanomaterial exhibits a pH less than 7 and a Hammet function, $H_0$, greater than −12 when suspended in water at 5 wt. %.

12. The method of claim 10, wherein making the AMO nanomaterial comprises:
    forming a solution comprising a metal salt, ethanol, and water;
    acidifying the solution by adding an acid to the solution;
    basifying the solution by adding an aqueous base to the solution;
    collecting precipitate from the solution;
    washing the precipitate; and
    drying the precipitate, wherein the precipitate corresponds to the AMO nanomaterial.

13. The method of claim 10, wherein the AMO nanomaterial comprises acidified tin oxide.

14. The method of claim 10, wherein the AMO nanomaterial comprises acidified iron oxide.

15. The method of claim 10, wherein the AMO nanomaterial comprises acidified zirconium oxide.

16. The method of claim 10, wherein the AMO nanomaterial comprises acidified titanium dioxide.

17. The method of claim 10, wherein the acidic species comprises:
    one or more organic acids selected from the group consisting of oxalic acid, acetic acid, maleic acid, methylmalonic acid, glutaric acid, succinic acid, methylsuccinic acid, methylenesuccinic acid, and citraconic acid, or
    one or more organic acid anhydrides selected from the group consisting of glutaric anhydride, methylsuccinic anhydride, and itaconic anhydride.

18. The method of claim 10, wherein the acidic species comprises citric acid or succinic anhydride.

* * * * *